(12) United States Patent
Shin

(10) Patent No.: US 8,893,470 B2
(45) Date of Patent: Nov. 25, 2014

(54) METHOD FOR PREVENTING CLOGGING OF UREA INJECTION NOZZLE OF SCR SYSTEM

(71) Applicants: Hyundai Motor Company, Seoul (KR); Kia Motors Corporation, Seoul (KR)

(72) Inventor: Jaeseok Shin, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/141,332

(22) Filed: Dec. 26, 2013

(65) Prior Publication Data

US 2014/0305100 A1    Oct. 16, 2014

(30) Foreign Application Priority Data

Apr. 15, 2013 (KR) .................. 10-2013-0041213

(51) Int. Cl.
- *F01N 3/00* (2006.01)
- *F01N 3/20* (2006.01)
- *F01N 11/00* (2006.01)

(52) U.S. Cl.
CPC ................ *F01N 3/208* (2013.01); *F01N 11/00* (2013.01)
USPC ............................................ 60/274; 60/277

(58) Field of Classification Search
USPC .................................................. 60/274, 277
See application file for complete search history.

(56) References Cited

U.S. PATENT DOCUMENTS

| | | | |
|---|---|---|---|
| 2007/0240405 A1* | 10/2007 | Nishina et al. | 60/286 |
| 2010/0005871 A1* | 1/2010 | Kitazawa | 73/114.69 |
| 2010/0071349 A1* | 3/2010 | Kitazawa | 60/277 |
| 2010/0139254 A1* | 6/2010 | Sebestyen et al. | 60/286 |
| 2011/0099983 A1* | 5/2011 | Ohno | 60/277 |
| 2011/0107742 A1* | 5/2011 | Igarashi et al. | 60/277 |
| 2013/0047585 A1* | 2/2013 | Cho et al. | 60/274 |

FOREIGN PATENT DOCUMENTS

KR    10-2013-0024082 A    3/2013

* cited by examiner

*Primary Examiner* — Thomas Denion
*Assistant Examiner* — Jason Shanske
(74) *Attorney, Agent, or Firm* — Morgan, Lewis & Bockius LLP

(57) ABSTRACT

In a method for preventing clogging of a urea injection nozzle in an after-run operation of a selective catalytic reduction (SCR) system which supplies urea stored in a urea tank through a supply module, a urea injection nozzle and a urea line connecting the supply module and the urea injection nozzle, the method may include an emptying step where the urea is withdrawn into the urea tank by creating negative pressure in the supply module and a pressure equilibrium step where the pressure in the supply module is recovered by stopping creation of negative pressure in the supply module, wherein in the pressure equilibrium step, whether to forcibly inject the urea is controlled on the basis of pressure after a predetermined time has passed since the pressure equilibrium step began.

10 Claims, 8 Drawing Sheets

FIG. 4
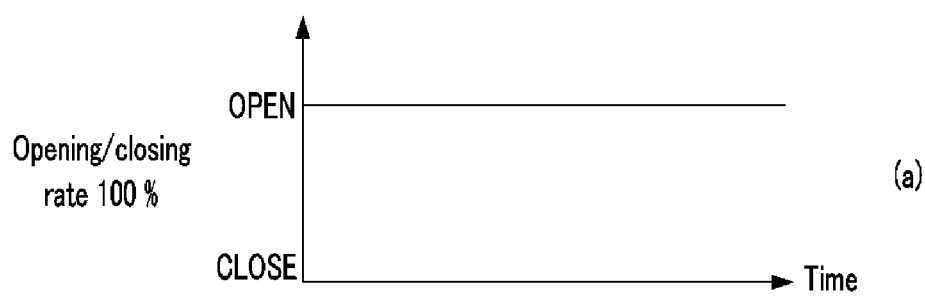
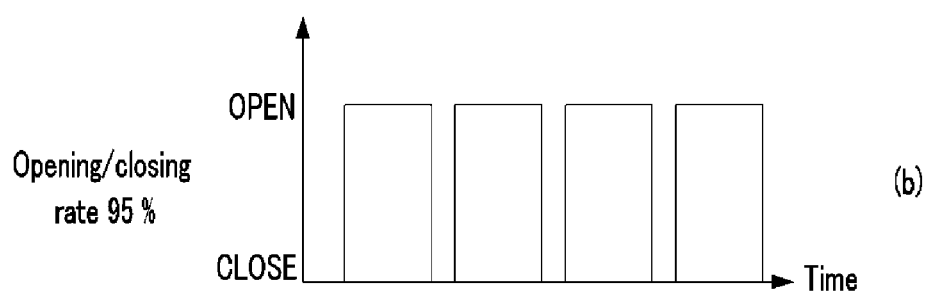

METHOD FOR PREVENTING CLOGGING OF UREA INJECTION NOZZLE OF SCR SYSTEM

CROSS-REFERENCE TO RELATED APPLICATION

The present application claims priority to Korean Patent Application No. 10-2013-0041213 filed on Apr. 15, 2013, the entire contents of which is incorporated herein for all purposes by this reference.

BACKGROUND OF THE INVENTION

1. Field of the Invention

The present invention relates to a method for preventing clogging of a urea injection nozzle of a SCR system. More particularly, the present invention relates to a method for preventing clogging of a urea injection nozzle of an SCR system which determines pressure within a supply module and prevents clogging of the urea injection nozzle in an after-run operation.

2. Description of Related Art

Generally, exhaust gas exhausted from an exhaust manifold of an engine is guided to a catalytic converter mounted in an exhaust pipe and purified, passes through a muffler to reduce noise, and is finally exhausted through the exhaust pipe to atmosphere.

The catalytic converter treats pollutants such as NOx within the exhaust gas.

A selective catalytic reduction (SCR) apparatus, one of catalytic converters, purifies NOx within the exhaust gas, and urea, ammonia, carbon monoxide, hydrocarbon (HC), and so on are used as a reductant.

When the reductant is supplied to the exhaust gas, nitrogen oxide within the exhaust gas is deoxidized to nitrogen by an oxidation-reduction reaction with the reductant.

FIG. 1 is a drawing showing a conventional SCR system.

As shown in FIG. 1, the conventional SCR system includes a urea tank 60 in which urea 62 is stored, a supply module 50 supplying the urea 62 from the urea tank 60, and a urea injection nozzle 20 supplying the urea supplied by the supply module 50 to a selective catalytic reduction catalyst 12.

The urea 62 passes through a filter 52 and is supplied an exhaust pipe 10 in front of the SCR catalyst 12.

A dosing control unit (DCU) 25 controls a supply amount of the urea 62.

A temperature sensor 15 may detect a temperature of the urea 62 or detect temperature of the exhaust gas passed through the SCR catalyst 12.

The urea 62 has characteristics that it is frozen at −11° C. or less and corrosiveness thereof is increased at 70° C. or more. Therefore, the urea 62 is withdrawn to the urea tank 60 when a vehicle and a system stop, which is called "after-run".

While the SCR apparatus is operated, the urea 62 is supplied from the urea tank 60 and the supply module 50 to the urea injection nozzle 20, and in the after-run operation, the urea is withdrawn in a reverse order.

If the urea injection nozzle 20 is heated by exhaust gas, the temperature of the urea reaches a crystallization temperature (71-75° C.), and as the after-run is operated with the urea injection nozzle 20 100% open, crystallization of the urea is generated in the urea injection nozzle 20 and thus the urea injection nozzle may be clogged.

That is, while the after-run is operated, the urea injection nozzle 20 has to be opened, and crystallization of the urea is generated in the urea injection nozzle 20, however clogging of the urea injection nozzle 20 may not be detected.

Particularly, if backward flow of the urea 62 from the urea tank 60 to the supply module 50 occurs in the winter season, the SCR system may be damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for preventing clogging of a urea injection nozzle of an SCR system which may repeat opening and closing of the urea injection nozzle and forcibly inject the urea in order to prevent clogging of the urea injection nozzle In an aspect of the present invention, a method for preventing clogging of a urea injection nozzle in an after-run operation of a selective catalytic reduction (SCR) system which supplies urea stored in a urea tank through a supply module, a urea injection nozzle and a urea line connecting the supply module and the urea injection nozzle, may include an emptying step where the urea is withdrawn into the urea tank by creating negative pressure in the supply module, and a pressure equilibrium step where the pressure in the supply module is recovered by stopping creation of the negative pressure in the supply module, wherein, in the pressure equilibrium step, whether to forcibly inject the urea is controlled on the basis of pressure after a predetermined time may have passed since the pressure equilibrium step began.

The emptying step may include comparing the pressure within the supply module with a first predetermined pressure, controlling the urea injection nozzle to be opened when the pressure within the supply module is determined to be higher than the first predetermined pressure, and repeating opening and closing of the urea injection nozzle when the pressure within the supply module is determined to be lower than or equal to the first predetermined pressure.

The pressure equilibrium step may include comparing an increase rate of the pressure within the supply module with a predetermined increase rate of the pressure, controlling the urea injection nozzle to be opened when the increase rate of the pressure within the supply module is determined to be higher than the predetermined increase rate of the pressure, and repeating opening and closing of the urea injection nozzle when the increase rate of the pressure within the supply module is determined to be lower than or equal to the predetermined increase rate of pressure.

The pressure equilibrium step may include forcibly injecting the urea a first predetermined number of times when the pressure within the supply module is determined to be lower than or equal to a second predetermined pressure after the predetermined time may have passed.

The pressure equilibrium step may further include forcibly injecting the urea a first predetermined number of times when the pressure within the supply module is determined to be lower than or equal to a second predetermined pressure after the predetermined time may have passed.

The forcibly injecting the urea the first predetermined number of times may include injecting the urea the first predetermined number of times and restarting the after-run operation when the number of times of starting the after-run is determined to be smaller than or equal to a second predetermined number of times.

The method may further include comparing ambient temperature with a predetermined temperature when the number of times of starting the after-run is determined to be larger than the second predetermined number of times.

The method may further include recording a pressure equilibrium failure event when the ambient temperature is determined to be higher than or equal to the predetermined temperature.

The method may further include warning a driver when the ambient temperature is lower than the predetermined temperature.

In another aspect of the present invention, a selective catalytic reduction (SCR) system which injects urea to an exhaust pipe for purifying exhaust gas passing through the exhaust pipe, may include a urea tank storing the urea, a supply module supplying the urea from the urea tank to the exhaust pipe, a urea injection nozzle connected with the supply module through a urea line and configured for injecting the urea to the exhaust pipe, and a dosing control unit executed by a predetermined program set to control the supply module and the urea injection nozzle, wherein the predetermined program may include a series of commands for performing each step of the method.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a graph showing opening/closing operations of a urea injection nozzle according to an exemplary embodiment of the present invention.

Figure 1:
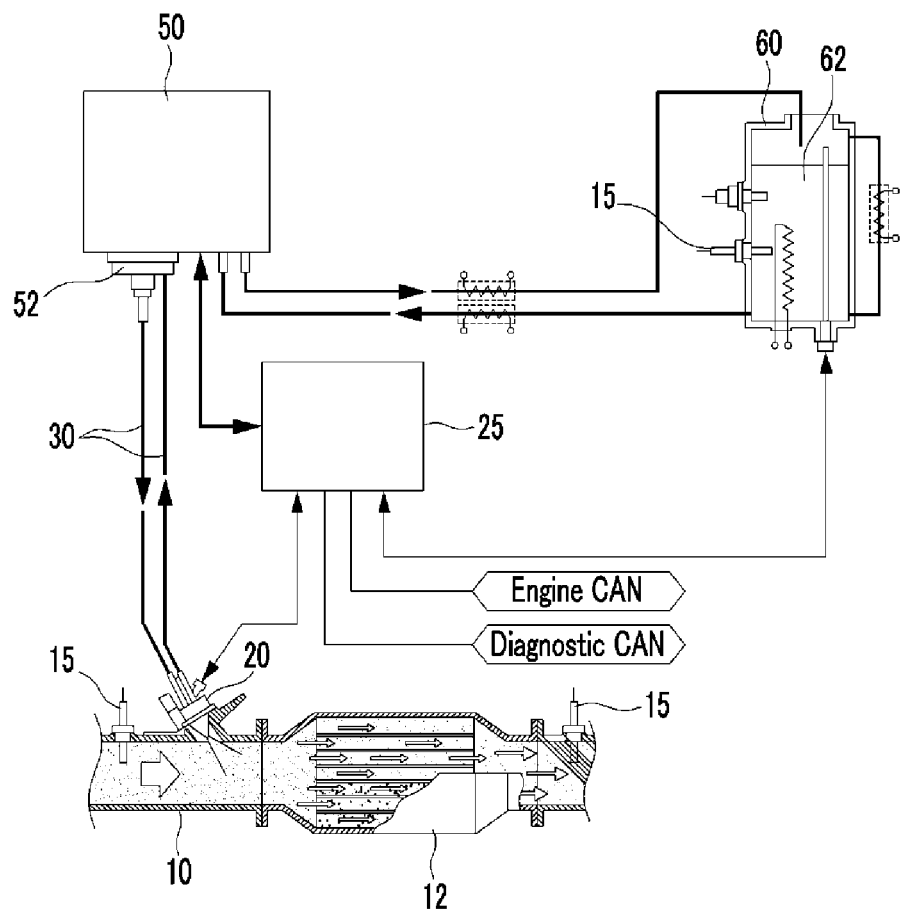
FIG. 1 is a drawing showing a conventional SCR system.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, unless explicitly described to the contrary, the word "comprise" and variations such as "comprises" or "comprising" will be understood to imply the inclusion of stated elements but not the exclusion of any other elements.

For easy comprehension, constituent elements described in the description of the related art will be described using the same reference numerals.

Figure 2:
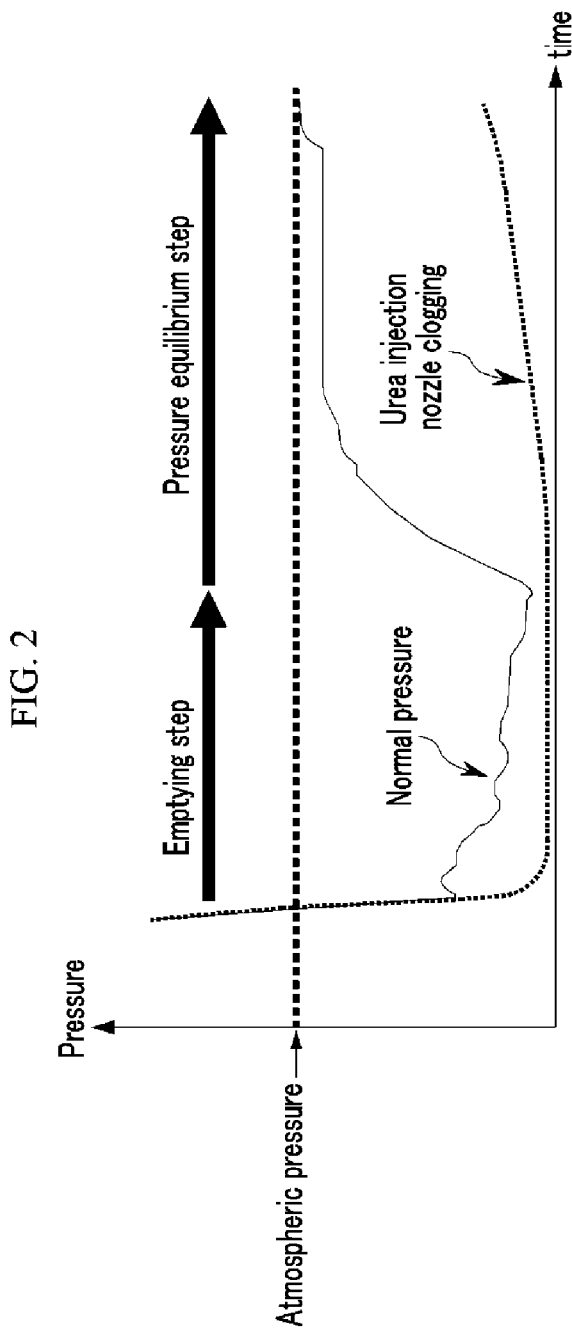
FIG. 2 is a graph showing pressure change in a supply module in after-run operation.

FIG. 2 is a graph showing pressure change in a supply module in an after-run operation.

FIG. 1 and referring to FIG. 2, a dosing control unit 25 may include at least one processor that executes a predetermined program, and the predetermined program may include a set of instructions for performing a method according to an exemplary embodiment of the present invention.

An after-run operation includes an emptying step (or vacuum step) wherein urea is withdrawn into a urea tank 60 by creating negative pressure in a supply module 50, and a pressure equilibrium step wherein the created negative pressure in the emptying step is recovered.

If excessive negative pressure remains in the supply module 50 after the pressure equilibrium step is completed, backward flow of the urea from the urea tank 60 to the supply module 50 occurs.

Figure 3:
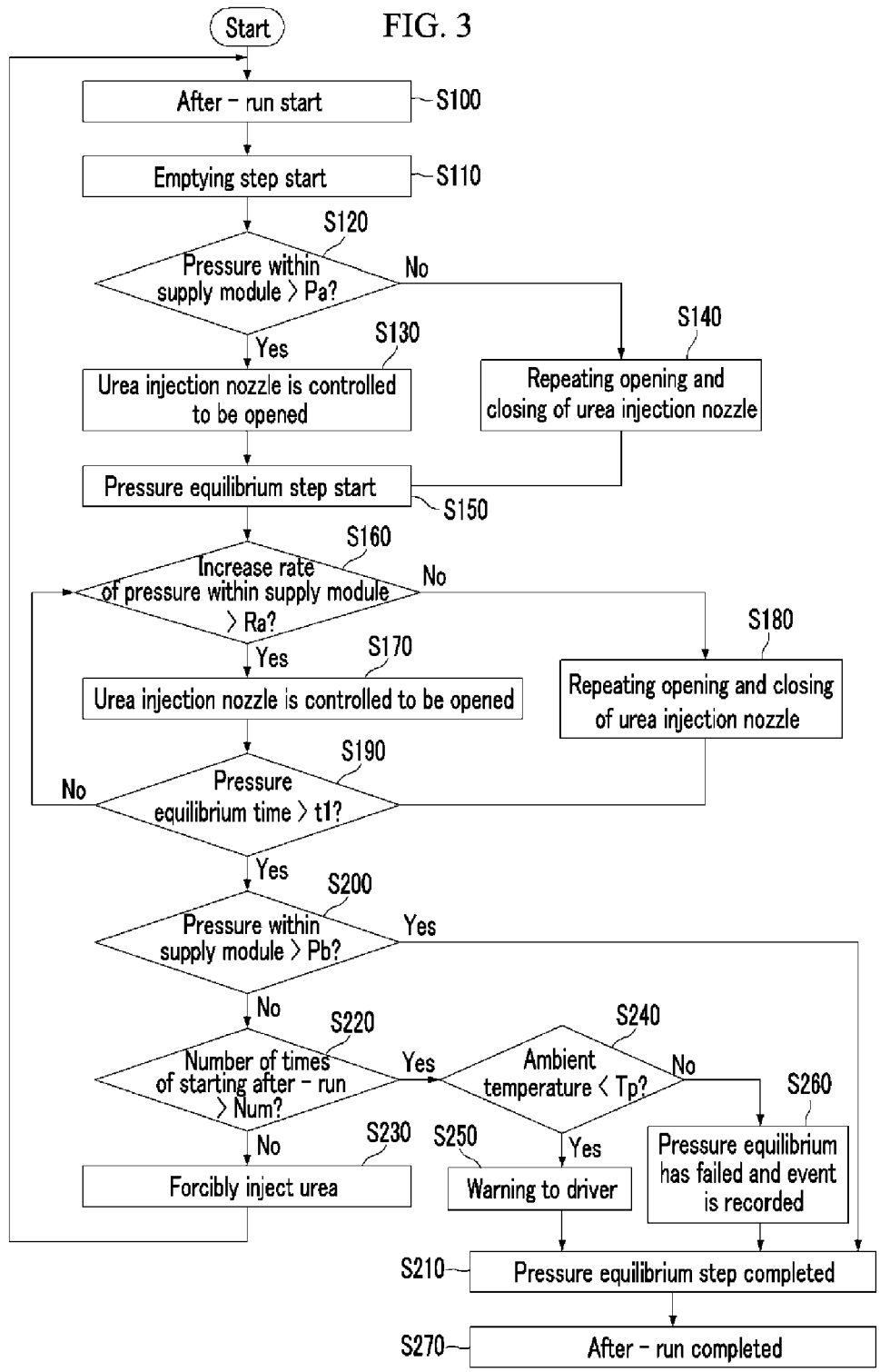
FIG. 3 is a flowchart showing a method for preventing clogging of a urea injection nozzle according to an exemplary embodiment of the present invention.

FIG. 3 is a flowchart showing a method for preventing clogging of a urea injection nozzle according to an exemplary embodiment of the present invention.

Referring to FIG. 3, when the after-run is operated (S100), the emptying step is started (S110).

When the emptying step is started, the dosing control unit 25 compares pressure within the supply module 50 with a first predetermined pressure (Pa) (S120).

If pressure within the supply module 50 is higher than the first predetermined pressure (Pa), the dosing control unit 25 determines that the urea injection nozzle 20 is not clogged and controls the urea injection nozzle 20 to be opened (S130).

However, if the pressure within the supply module 50 is lower than or equal to the first predetermined pressure (Pa), the dosing control unit 25 determines that the urea injection nozzle 20 is clogged and controls the urea injection nozzle 20 to be repeatedly opened and closed (S140).

Accordingly, by repeating open/close of the urea injection nozzle 20, clogging of the urea injection nozzle 20 may be prevented, and the first predetermined pressure (Pa), for example, may be about −210 mbar.

After the emptying step is completed, the pressure equilibrium step is started (S150).

In the pressure equilibrium step, the urea injection nozzle 20 may also be clogged, and thus the dosing control unit 25 determines whether the urea injection nozzle 20 is clogged.

The dosing control unit 25 compares an increase rate of the pressure within the supply module 50 with a predetermined increase rate of pressure (Ra) (S160), and the dosing control unit 25 determines that the urea injection nozzle 20 is not clogged if the increase rate of the pressure within the supply module 50 is higher than the predetermined increase rate of pressure (Ra), so the dosing control unit 25 controls the urea injection nozzle 20 to be opened (S170).

However, if the increase rate of the pressure of the supply module 50 is lower than or equal to the predetermined increase pressure (Ra), the dosing control unit 25 determines that the urea injection nozzle 20 is clogged, so the dosing control unit 25 controls the urea injection nozzle 20 to be repeatedly opened and closed (S180).

In the pressure equilibrium step, pressure within the supply module 50 has to be increased to about atmospheric pressure. If the pressure within the supply module 50 is not increased, it may be determined that the urea injection nozzle 20 is clogged. In this case, the predetermined increase rate of pressure (Ra) may be, for example, 5.5 mbar/sec.

After the step S170 or S180, the dosing control unit 25 determines whether the pressure equilibrium step is completed. The completion of the pressure equilibrium step is determined by comparing pressure equilibrium time with a predetermined time (t1) (S190).

If the pressure equilibrium time is less than or equal to the predetermined time (t1), the dosing control unit 25 repeatedly performs the steps S160 to S180.

If the pressure equilibrium time is greater than the predetermined time (t1), the dosing control unit 25 again determines whether the urea injection nozzle 20 is clogged.

The dosing control unit 25 compares the pressure within the supply module 50 with the second predetermined pressure (Pb) (S200), and the dosing control unit 25 determines that the pressure equilibrium step is normally implemented if the pressure within the supply module 50 is higher than the second predetermined pressure (Pb), and thus the pressure equilibrium step is completed (S210).

In this case, the second predetermined pressure (Pb) may be, for example, about −100 mbar higher than the first predetermined pressure (Pa).

If the pressure within the supply module 50 is similar to the second predetermined pressure (Pb), the dosing control unit 25 determines that the backward flow of the urea does not occur, so the pressure equilibrium step is completed.

If the pressure within the supply module 50 is lower than or equal to the second predetermined pressure (Pb), the dosing control unit 25 performs an additional pressure equilibrium step. The dosing control unit 25 may control the urea injection nozzle 20 to forcibly inject the urea 62 a first predetermined number of times (N1).

The dosing control unit 25 compares the number of times of starting the after-run with a second predetermined number of times (Num) (S220).

If the number of times of starting the after-run is smaller than or equal to the second predetermined number of times (Num), the dosing control unit 25 controls the urea injection nozzle 20 to forcibly inject the urea the first predetermined number of times (N1) and restarts the after-run (S230). In this case, the first predetermined number of times (N1) may be, for example, one.

If the urea injection nozzle 20 forcibly injects the urea the first predetermined number of times (N1), crystallization of the urea of the urea injection nozzle 20 can be eliminated and the temperature of the urea can be controlled.

If the number of times of starting the after-run is larger than the second predetermined number of times (Num), the dosing control unit 25 compares the ambient temperature with a predetermined temperature (Tp) (S240).

In this case, the predetermined temperature (Tp) in consideration of the crystallization of the urea may be, for example, about 0° C.

If the ambient temperature is lower than the predetermined temperature (Tp), the pressure equilibrium step is completed (S210), and thus the after-run operation is completed (S270).

In this case, the urea may be frozen, and thus a warning lamp may be turned on or a warning sound may be generated for warning a driver (S250).

If the ambient temperature is higher than or equal to the predetermined temperature (Tp), the dosing control unit 25 determines that the pressure equilibrium has failed, so the dosing control unit 25 records a pressure equilibrium failure event (S260) and the pressure equilibrium step is completed (S210), and the after-run operation is completed (S270).

Hereinafter, a detailed method for preventing clogging of the urea injection nozzle 20 according to an exemplary embodiment of the present invention will be described.

FIG. 4 is a graph showing opening/closing operations of a urea injection nozzle according to an exemplary embodiment of the present invention.

Referring to FIG. 4, if it is determined that the urea injection nozzle 20 is clogged, the dosing control unit 25 controls the urea injection nozzle 20 to be opened and closed at 95% of the opening/closing rate.

That is, opening and closing durations of the urea injection nozzle 20 are implemented at ratio of 95:5 so that the urea injection nozzle 20 is not clogged. For example, the urea injection nozzle 20 may be repeatedly opened for 950 ms and closed for 50 ms, and the value of 95% can be set to an appropriate value according to design specifications.

Figure 5:
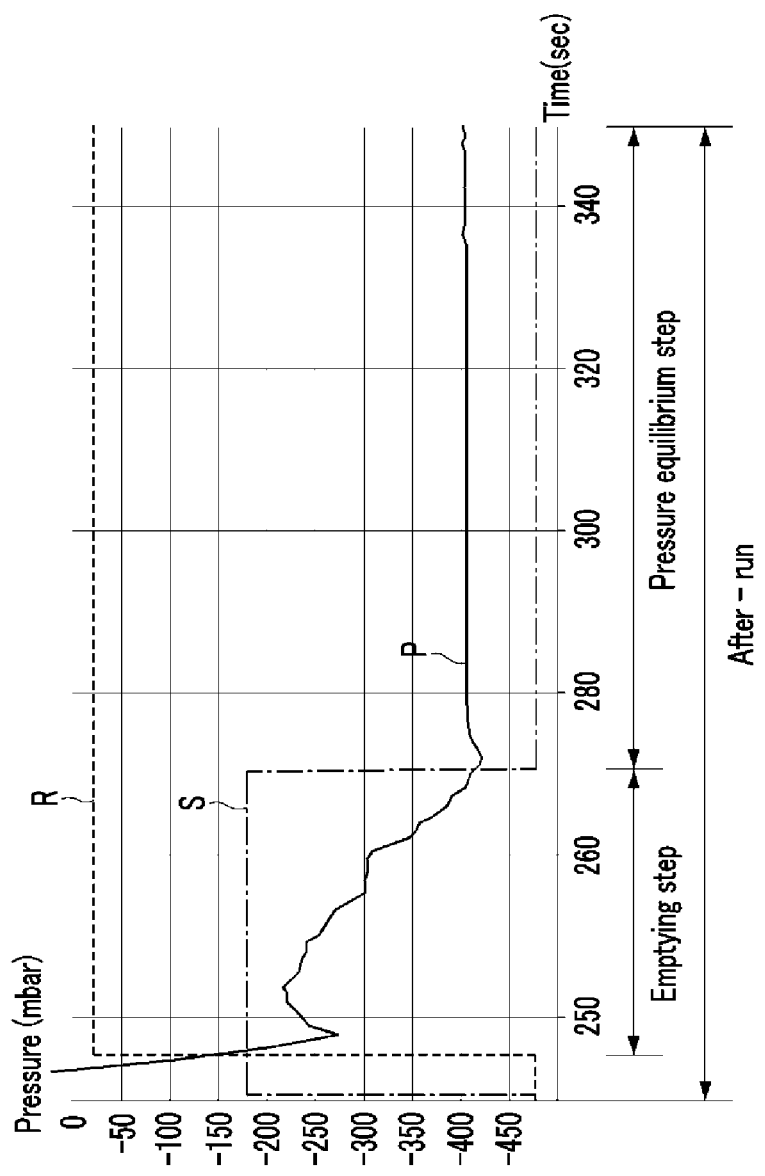
FIG. 5 is a graph showing pressure change in a supply module in an after-run operation when a urea injection nozzle is clogged.

FIG. 5 is a graph showing pressure change in a supply module in an after-run operation when a urea injection nozzle is clogged.

Figure 6:
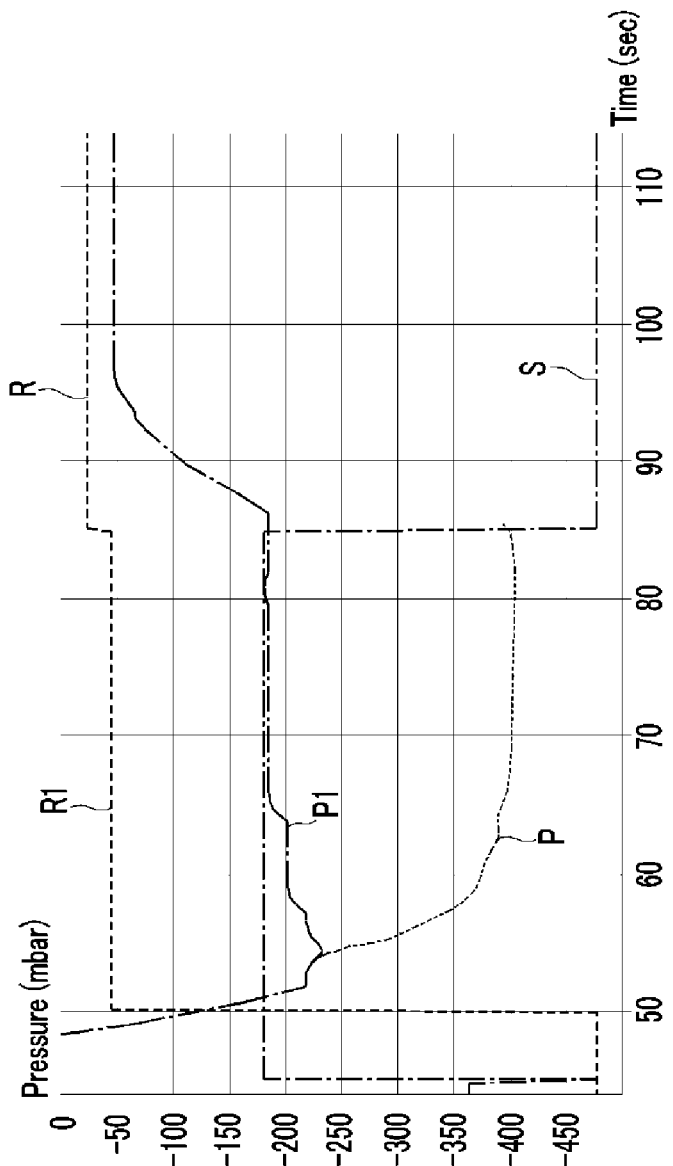
FIG. 6 to FIG. 8 are graphs showing pressure change within a urea line at an emptying step and a pressure equilibrium step according to an exemplary embodiment of the present invention.
Figure 7:
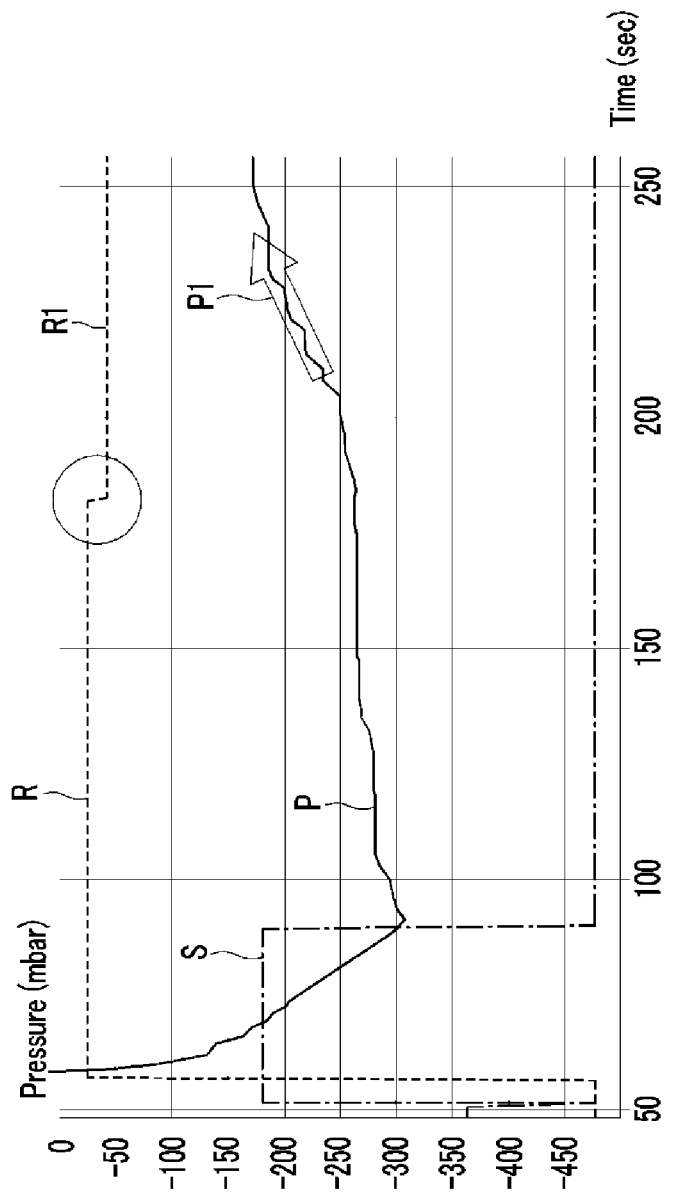
Figure 8:
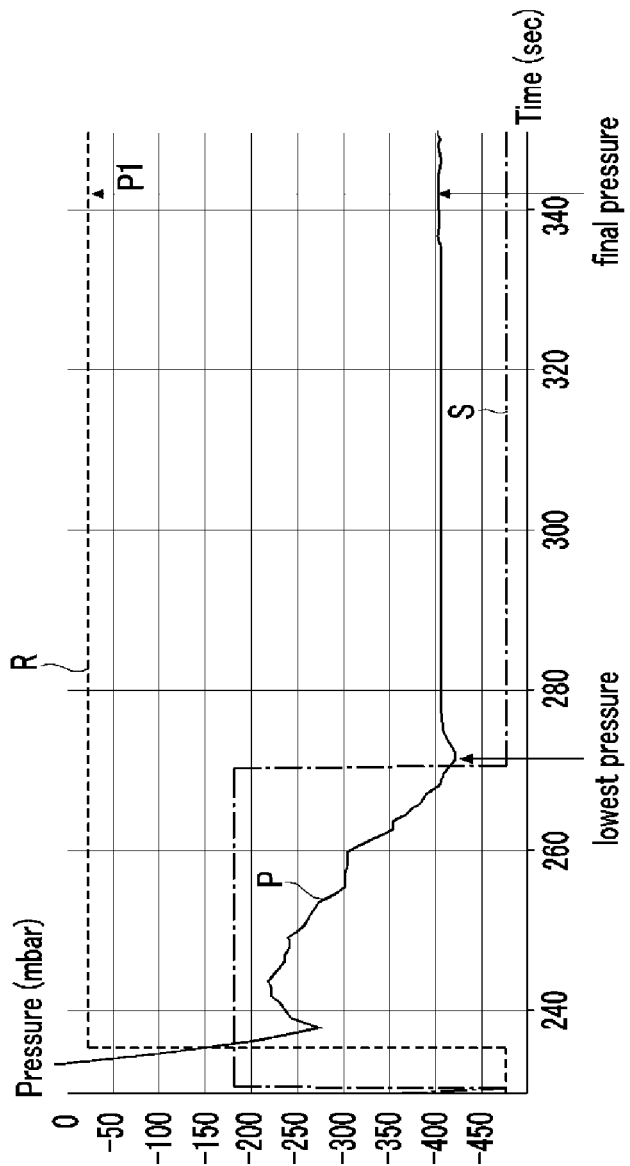

FIG. 6 to FIG. 8 are graphs showing pressure change within a urea line in an emptying step and a pressure equilibrium step according to an exemplary embodiment of the present invention.

In the FIG. 5 to FIG. 8, "R" denotes an opening/closing rate of the urea injection nozzle 20, "R1" denotes an opening/closing rate of the urea nozzle 20 when R is 95%, "P" denotes pressure in the supply module 50, and "S" denotes rotation speed of a supply module motor.

Referring to FIG. 5, if the urea injection nozzle 20 is opened 100% and the urea injection nozzle 20 is clogged during the after-run operation, excessive negative pressure is created within the supply module 50 in the emptying step and the pressure equilibrium step.

Referring to FIG. 6, when the pressure within the supply module 50 reaches to −210 mbar in the emptying step, the dosing control unit 25 controls opening and closing operations of the urea injection nozzle 20 at 95% of the opening/closing rate (R1) in order to not excessively lower the pressure in the supply module 50.

That is, the pressure within the supply module 50 follows a line denoted as P1 rather than a line denoted as P, and thus the after-run is normally performed.

Referring to FIG. 7, if the increase rate of pressure within the supply module 50 is lower than the predetermined increase rate of pressure (Ra) in the pressure equilibrium step, the urea injection nozzle 20 is controlled to be opened and closed at 95% of opening/closing rate (R1), and thus the pressure within the supply module 50 follows a line denoted as P1.

That is, the dosing control unit 25 controls the opening/closing rate of the urea injection nozzle 20 so that the urea injection nozzle 20 is not clogged, and thus backward flow may not occur.

Referring to FIG. 8, if the pressure within the supply module 50 is lower than or equal to the second predetermined pressure (Pb) in the pressure equilibrium step, the dosing control unit 25 controls the urea injection nozzle 20 to forcibly inject the urea 62 the first predetermined number of times (N1), so the pressure within the supply module 50 is increased to P1.

That is, if the urea 62 is injected the first predetermined number of times (N1), the urea injection nozzle 20 is not clogged and backward flow may not occur.

A method for preventing clogging of a urea injection nozzle of an SCR system according to an exemplary embodiment of the present invention may stably perform the after-run operation.

That is, by repeating open/close of the urea injection nozzle 20 and forcibly injecting the urea, it is possible to prevent clogging of the urea injection nozzle 20 and backward flow of the urea.

Since no urea remains in the urea line 30, an extra heating system for defrosting the urea in the winter season is not required.

Further, if the SCR system is damaged, the driver can notice the warning.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A method for preventing clogging of a urea injection nozzle in an after-run operation of a selective catalytic reduction (SCR) system which supplies urea stored in a urea tank through a supply module, a urea injection nozzle and a urea line connecting the supply module and the urea injection nozzle, the method comprising:
   an emptying step where the urea is withdrawn into the urea tank by creating negative pressure in the supply module; and
   a pressure equilibrium step where the pressure in the supply module is recovered by stopping creation of the negative pressure in the supply module,
   wherein, in the pressure equilibrium step, whether to forcibly inject the urea is controlled on the basis of pressure after a predetermined time has passed since the pressure equilibrium step began.

2. The method of claim 1, wherein the emptying step comprises:
   comparing the pressure within the supply module with a first predetermined pressure;
   controlling the urea injection nozzle to be opened when the pressure within the supply module is determined to be higher than the first predetermined pressure; and
   repeating opening and closing of the urea injection nozzle when the pressure within the supply module is determined to be lower than or equal to the first predetermined pressure.

3. The method of claim 1, wherein the pressure equilibrium step comprises:
   comparing an increase rate of the pressure within the supply module with a predetermined increase rate of the pressure;
   controlling the urea injection nozzle to be opened when the increase rate of the pressure within the supply module is determined to be higher than the predetermined increase rate of the pressure; and
   repeating opening and closing of the urea injection nozzle when the increase rate of the pressure within the supply module is determined to be lower than or equal to the predetermined increase rate of pressure.

4. The method of claim 1, wherein the pressure equilibrium step comprises forcibly injecting the urea a first predetermined number of times when the pressure within the supply module is determined to be lower than or equal to a second predetermined pressure after the predetermined time has passed.

5. The method of claim 3, wherein the pressure equilibrium step further comprises forcibly injecting the urea a first predetermined number of times when the pressure within the supply module is determined to be lower than or equal to a second predetermined pressure after the predetermined time has passed.

6. The method of claim 5, wherein the forcibly injecting the urea the first predetermined number of times comprises:
   injecting the urea the first predetermined number of times and restarting the after-run operation when the number of times of starting the after-run is determined to be smaller than or equal to a second predetermined number of times.

7. The method of claim 6, further comprising:
   comparing ambient temperature with a predetermined temperature when the number of times of starting the after-run is determined to be larger than the second predetermined number of times.

8. The method of claim 7, further comprising:
   recording a pressure equilibrium failure event when the ambient temperature is determined to be higher than or equal to the predetermined temperature.

9. The method of claim 7, further comprising:
   warning a driver when the ambient temperature is lower than the predetermined temperature.

10. A selective catalytic reduction (SCR) system which injects urea to an exhaust pipe for purifying exhaust gas passing through the exhaust pipe, the system comprising:
    a urea tank storing the urea;
    a supply module supplying the urea from the urea tank to the exhaust pipe;
    a urea injection nozzle connected with the supply module through a urea line and configured for injecting the urea to the exhaust pipe; and
    a dosing control unit executed by a predetermined program set to control the supply module and the urea injection nozzle,
    wherein the predetermined program includes a series of commands for performing each step of the method of claim 1.

* * * * *